United States Patent [19]

Müller

[11] Patent Number: 4,748,388
[45] Date of Patent: May 31, 1988

[54] BRUSHLESS D.C. MOTOR HAVING RC TIME-DELAY STAGE(S) AND DRIVER TRANSISTORS WHICH PREVENT SIMULTANEOUS CONDUCTION BY THE POWER TRANSISTORS OF THE WOUND CONDUCTOR PAIR(S) OF THE MOTOR WINDING

[75] Inventor: Rolf Müller, St. Georgen, Fed. Rep. of Germany

[73] Assignee: Papst-Motoren GmbH & Co KG, St. Georgen/Black Forest, Fed. Rep. of Germany

[21] Appl. No.: 757,647

[22] Filed: Jul. 22, 1985

[30] Foreign Application Priority Data

Jul. 20, 1984 [DE] Fed. Rep. of Germany ....... 3426780

[51] Int. Cl.$^4$ ............................................ H02K 29/08
[52] U.S. Cl. .................................... 318/254; 318/138; 318/439
[58] Field of Search ............. 310/68 R; 318/254, 138, 318/439

[56] References Cited

U.S. PATENT DOCUMENTS

| 4,030,005 | 6/1977 | Doemen | 318/138 |
| 4,374,347 | 2/1983 | Muller | 318/254 X |
| 4,379,984 | 4/1983 | Muller | 318/138 X |

FOREIGN PATENT DOCUMENTS

| 3342986 | 6/1985 | Fed. Rep. of Germany | 318/254 |
| 1528573 | 10/1978 | United Kingdom | 318/254 |
| 1590286 | 5/1981 | United Kingdom | 318/254 |

*Primary Examiner*—Bentsu Ro
*Attorney, Agent, or Firm*—Theodore J. Koss, Jr.

[57] ABSTRACT

In a two-conductor, two-pulse brushless d.c. motor (10) driver transistors (44, 45) are provided for the end-stage transistors (52, 53) and are connected at a control electrode thereof to a potential (point 47) which, e.g., amounts to half the supplied d.c. voltage. These driver transistors are activated by a Hall-IC (32) having a digital signal (41). In order to avoid an abrupt switch-over from one conductor (25) to the other conductor (26), each driver transistor (44, 45) has its own RC-stage (43', 46' or 43", 46"). In this way one produces current-less gaps between successive stator-current pulses and implements a relatively soft switching of the end-stage transistors, so that the motor is caused to run quietly.

16 Claims, 4 Drawing Sheets

BRUSHLESS D.C. MOTOR HAVING RC TIME-DELAY STAGE(S) AND DRIVER TRANSISTORS WHICH PREVENT SIMULTANEOUS CONDUCTION BY THE POWER TRANSISTORS OF THE WOUND CONDUCTOR PAIR(S) OF THE MOTOR WINDING

BACKGROUND OF THE INVENTION

The invention concerns brushless d.c. motors the winding of which comprises at least one pair of wound conductors, the conductor pair carrying two current pulses per 360°-el. of rotor rotation, one current pulse being carried by one wound conductor of the pair, the other by the other conductor of the pair, the two wound conductors being connectable to an electrical source, alternately, via respective controllable semiconductor power-carrying elements, such as power transistors that are of conductivity types opposite to or complementary to each other, this occurring under the control of rotor position sensor(s). In this well known motor-circuit configuration, the first conductor of the pair is at one end connected to a first terminal of the source and at its other end is connectable to the second terminal of the source via the associated power-carrying element; similarly, the second conductor of the pair is at one end connected to the second terminal of the source, the other end of the second conductor being connectable to the first terminal of the source via its associated power-carrying element.

More particularly, the present invention concerns a certain version of the above well known motor-circuit configuration, in which version the two conductors of the pair exhibit a.c. voltage coupling, at least at the ends thereof that are connected to the associated controllable semiconductor powercarrying elements.

A motor of such type has been disclosed in West German published patent application ("Offenlengungsschrift") DE-OS No. 30 10 435 and in corresponding U.S. pat. No. 4,374,347 issued Feb. 15, 1983. The two-pulse motor therein illustrated has an extraordinarily simple construction, and the insulation of the two conductors is with such motor less stressed than with other motors, so that the insulation has a higher lifetime.

SUMMARY OF THE INVENTION

It is an object of the invention to further improve this motor.

In accordance with the invention, this object is achieved as follows: Each controllable semiconductor power-carrying element, e.g. power transistor, is provided with an associated driver transistor of conductivity type opposite to or complementary to that of the power-carrying element, the driver transistors thus being themselves of conductivity types that are opposite to or complementary to each other. Additionally, there are provided resistor-capacitor time-delay means, comprising at least one RC time-delay stage associated with and influencing the operation of the driver transistors to introduce a time delay between switch-OFF of the first power-carrying element and switch-ON of the second, and to similarly introduce a time delay between switch-OFF of the second power-carrying element and switch-ON of the first.

In accordance therewith it becomes possible in an extraordinarily simple way to delay the commutation operations and to insert a currentless interval between each two successive stator-current pulses. This improves the efficiency of such a motor; protects the power transistors, inasmuch as the commutation already begins as long as the induced voltage is still relatively high; and reduces the motor's noise, inasmuch as undesirable current spikes occuring during the commutation operation are avoided.

Further specifics and advantageous features of the invention may be had from the exemplary embodiments, described below and shown in the drawing but which in now way are to be understood as limiting the invention, and also may be had from the dependent claims.

DESCRIPTION OF THE PREFERRED EMBODIMENTS

Figure 1:
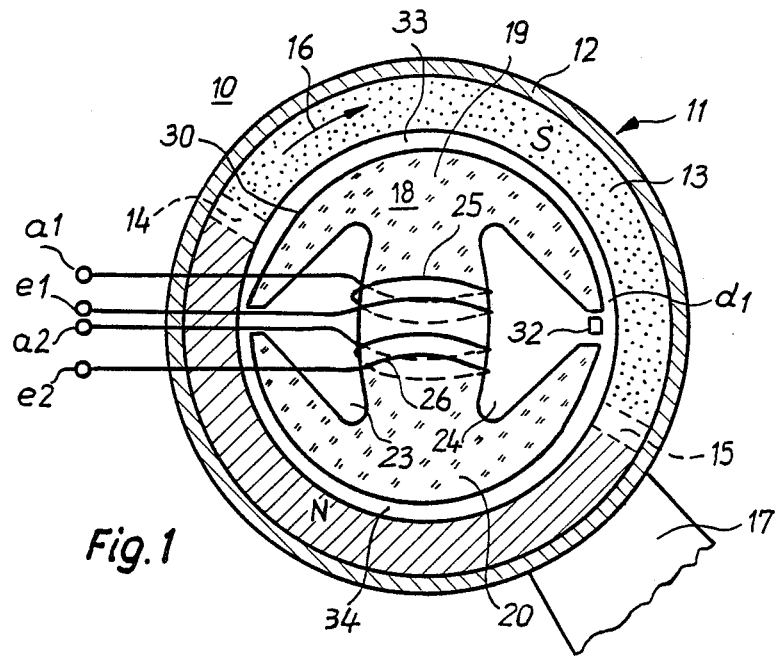
FIG. 1 is a schematic representation of a two-conductor, two-pulse brushless d.c. motor of known construction.

In the following Figures like or like-acting elements are each time denoted by the same reference numerals and usually described only once.

FIG. 1 depicts schematically a two-pulse brushless d.c. motor 10, such as known from, e.g., U.S. Pat. No. 4,030,005 or from West German patent DE-PS No. 23 46 380.

DEFINITIONS

Two-Pulse: The pulse character indicates the number of current pulses supplied to the stator winding per 360°-el. of rotor rotation. For the FIG. 1 motor, e.g. during one complete rotation, which in the case of a two-pole motor corresponds to 360°-el., only two current pulses are supplied to the motor, of substantially equal length and equal magnitude, one pulse flowing through conductor 25 in the direction from a1 to e1, and the other flowing through conductor 26 in the direction from e2 to a2.

Two-Conductor: The motor's winding has two conductors 25 and 26.

Two-Pole: The rotor has two poles.

It is emphasized that the present invention is likewise applicable to motors having a higher number of poles, e.g. applicable to four-pole, six-pole, etc., motors, and that it is equally suitable, too, for e.g. four- or six-pulse motors; in the case of, for example, a four-pulse motor, the circuit of FIGS. 2, 3, 5 or 6 must be doubled, and the two Hall-IC's must be arranged on the stator at a corresponding spacing, for example in the case of a four-pulse motor be at a spacing of 90°-el.

The motor 10 shown in FIG. 1 is an external-rotor motor having a two-pole external rotor 11 whose radial magnetization is in customary manner indicated by N and S. Preferably, this magnetization is approximately trapezoidal in shape with narrow gaps 14 and 15 (ca. 5° to 10°-el.) between the poles. The trapezoidally shaped magnetization provides a practically constant induction (=magnetic-flux density) for intervals of 170° to 175°-el., each time followed by a monotonic decrease in the magnetization; cf. the West German Patent DBP No. 23 46 380, where this is explained in detail.

The rotor 11 has a peripheral part 12, e.g. made of deep-drawn steel, whose (non-illustrated) bottom connected to the (non-illustrated) rotor shaft. Secured in this cup 12 is the actual magnet 13, usually a so-called rubber-magnet. Fan blades 17 of a fan that is to be driven by the motor 10 are welded onto the cup 12. Only a single blade 17 is shown. In FIG. 1 the locations having practically constant induction for the north pole are schematically indicated by hatching and for the south pole by means of small dots. The rotation direction is denoted by 16.

Figure 2:
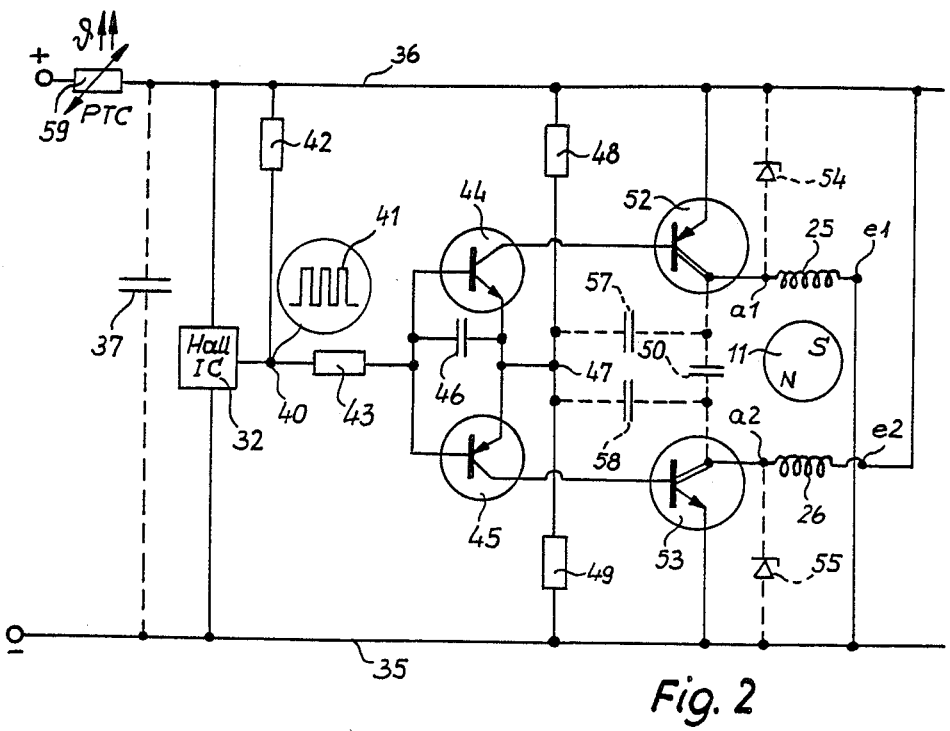
FIG. 2 depicts a first exemplary embodiment of the invention.

The stator 18 has two salient poles: an upper pole 19 and a lower pole 20 which enclose between themselves slots 23 and 24 in which the two conductors 25 and 26 of the stator winding are arranged, their connection terminals being denoted by al and el (conductor 25) and by a2 and e2 (conductor 26). A rotor-position sensor 32 is arranged at the opening into the slot 24. The sensor 32 is here designed as a digitally operating Hall-IC which at its output produces a control signal 41 (FIG. 2). Of course other sensors are also possible, e.g. an optical sensor, analog operating Hall-IC's, reed switches, etc.

The air gap 33 along the stator pole 19, and the identically shaped air gap 34 along the pole 20 are designed in the manner shown in U.S. Pat. No. 4,030,005. For example, beginning from the slot 23, the air gap 33 increases in the rotation direction up to a maximum 30, and from there on decreases monotonically. In this way there is produced reluctance torque of the desired shape. For the sake of brevity, reference is made to West German Patent DBP No. 23 46 380, to avoid unnecessary length herein. Of course a motor according to the invention can in the same way be designed as an internal-rotor motor. The air-gap shape depends upon the desired shape for the reluctance torque and depends upon the nature of the magnetization of rotor 11. The pole gaps 14 and 15 can advantageously be inclined. The FIG. 1 motor is shown only as an example to facilitate understanding of the circuits shown further below. Self-evidently other motors can also be employed in the same way, e.g. internal-rotor motors, flat-air-gap motors, etc.

The digitally operating Hall-IC 32 that serves as rotor-position transducer is connected at one of its connection terminals to the negative line 35 and at another of its connection terminals to the positive line 36. Connected in parallel to it is a storage capacitor 37 (e.g. 100 microfarads). During operation there is produced at output 40 of Hall-IC 32 the Hall-IC's control signal 41 which changes state between "high" and "low", e.g. between about zero volts and about 24 volts, if the voltage between the lines 36 and 35 amounts to 24 V. This output of Hall-IC 32 is connected, via a resistor 42 to the positive line 36 and via a resistor 43 to the control electrodes (bases) of an non driver transistor 44 and a pnp driver transistor 45. The emitters of the transistors 44 and 45 are connected to each other, and via a capacitor 46 of low capacitance value (1 to 10 nF) to their bases, and are directly connected to a center tap 47, from which latter a resistor 48 leads to the positive line 36 and a resistor 49 to the negative line 35. The resistors 48 and 49 together form a voltage divider and usually have about the same resistance values, so that at the center tap 47 there be available a reference potential of half the operating potential.

The collector of driver transistor 44 is connected to the base of a pnp Darlington transistor 52, and the collector of the driver transistor 45 is connected to the base of an npn Darlington transistor 53. The emitter of transistor 52 is connected to the positive line 36, and that of transistor 53 to the negative line 35. The collector of the transistor 52 is connected to the connection terminal al of conductor 25, whose other connection terminal el is connected to the negative line 35. Likewise, the collector of transistor 53 is connected to the connection terminal a2 of conductor 26, whose other connection terminal e2 is connected to the positive line 36.

A zener diode 54 can be connected parallel to the emitter-collector path of the Darlington transistor 52, and a zener diode 55 parallel to the emitter-collector path of the Darlington transistor 53. The diodes 54 and 55 serve to render harmless voltage spikes occurring when the respective one of the transistors is rendered non-conductive.

Equally well, a respective feedback capacitor 57 or 58 can be provided to connect the collector of a respective one of the Darlington transistors 52 and 53 to the center tap 47 (and thus to the emitters of driver transistors 44 and 45); these capacitors typically have a value of 5 to 30 nF each and serve to reduce the switching speed of the Darlington transistors 52 and 53 and thus also to suppress voltage spikes occurring upon switch-off and HF-interference. It has been shown that the feedback capacitors 57 and 58 are outstandingly effective in this respect.

OPERATION OF FIG. 2

If during operation the control signal 41 has a low value the driver transistor 45 conducts, and thus also the Darlington transistor 53, so that a current flows through the conductor 26 from e2 to a2. In such event there is present across the capacitor 46 the emitter-base voltage of the driver transistor 45, amounting to about 0.6 V; i.e. in FIG. 2 the left electrode of capacitor 46 is more negative than its right electrode.

If now the control signal 41 undergoes a change of state to a high value, for example up to +24 V, the driver transistor 45 becomes non-conductive, and specifically with a certain slight delay, because the capacitor 46 must first of all reverse charge via the high-resistance resistor 43 to such an extent that its voltage drops to below the "threshold voltage" of the base-emitter path of transistor 45. There then follows a relatively long reverse-charging time during which the capacitor 46 becomes reverse-charged from the "threshold voltage" of transistor 45 (e.g. −0.5 V with respect to point 47) up to the "threshold voltage" of transistor 44 (e.g. +0.5 V with respect to point 47). During this relatively lengthy reverse-charging time neither of the two driver transistors, and thus neither of the two power transistors 52, 53 is conductive; i.e., one obtains the desired current gap at the time at which the commutation occurs. Only after elapse of this gap does the driver transistor 44 become conductive; i.e., the duration of the gap between the conductive states can be selected as desired by choosing the size of the capacitor 46 and of the resistor 43. Thus, during this reverse-charging operation the power transistors are both non-conductive.

When the driver transistor 44 becomes conductive, the power transistor 52 receives a base current and likewise becomes conductive, so that a current flows in conductor 25 from a1 to e1.

The conductors 25 and 26 are a.c.-voltage-coupled to each other by virtue of their being arranged on the same stator sheet-metal stack 18. If this coupling is not sufficiently great, e.g. in the absence of a stator sheet-metal stack, a coupling capacitor 50 can be connected between the connection terminals a1 and a2, such as described in detail in West German published patent application ("Offenlegungsschrift") DE-OS No. 30 10 435, to whose entire disclosure reference is made in order to avoid unnecessary length herein.

Figure 4:
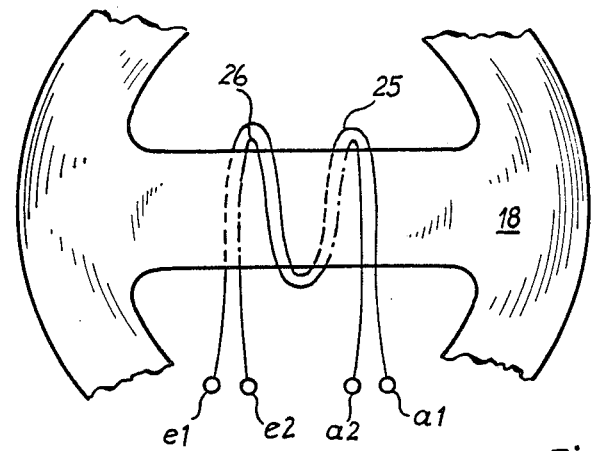
FIG. 4 is a schematic representation of a bifilar, i.e., two-wire, two-conductor winding, such as can advantageously be used with the invention.

Alternatively, to achieve a tight a.c.-voltage-coupling between the conductors 25 and 26, these can be wound in two-wire fashion (the so-called bifilar winding method), such as illustrated schematically in FIG. 4.

In FIG. 2 a PTC resistor 59 is connected in the positive line 36 to protect the motor 10 against overheating in the event its rotor 11 is blocked, in other words cannot turn. If due to blocking of the rotor 11 the motor current becomes too large, resistor 59 heats up and lowers the motor current to a non-dangerous level.

Figure 3:
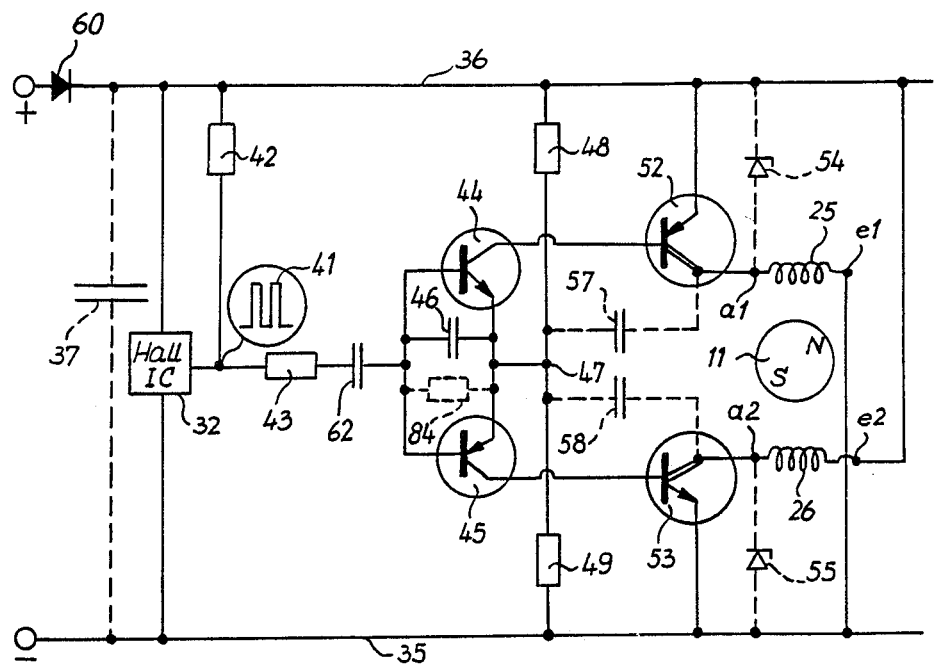
FIG. 3 depicts a variant of FIG. 1 in which a single coupling capacitor of low capacitance value achieves reliable non-conduction in the two conductors.

FIG. 3 depicts a variant of FIG. 2. The PTC resistor 59 is replaced by a diode 60 which prevents current flow in the event the motor is connected to power with wrong polarity; and, in series with the resistor 43 of RC-stage 43, 46, there is inserted a capacitor 62 of e.g. 0.1 microfarads, serving as a blocked-rotor safety device. The remaining elements of the FIG. 3 circuit are the same as those in FIG. 2 and are therefore not described again.

During operation the FIG. 3 circuit performs in the manner that has been described with respect to FIG. 2; when driver transistor 45 is conductive current flows from right to left (as viewed in FIG. 3) through the coupling capacitor 62, and then when the driver transistor 44 is conductive such current flows therethrough from left to right, so that the coupling capacitor 62 is being continually reverse-charged, and presents only a low impedance to the a.c. current flowing through it.

If rotor 11 becomes blocked, and assuming for example that driver transistor 44 is conducting, then current flows through resistors 42, 43, the capacitor 62, the base-emitter path of driver transistor 44, the center tap 47, and the resistor 49, for such a time until the capacitor 62 has charged sufficiently. Then, this capacitor acts as an isolator and the driver transistor 44 ceases to receive base current and the motor practically ceases to carry current.

To get the motor to start up again, either one briefly switches the motor off and then on again, or one gives the rotor 11 a brief turn. Whereupon the motor 10 turns again.

With the FIG. 3 motor it is especially advantageous that (a) only a single coupling capacitor 62 is needed for the two conductors 25 and 26, and (b) this coupling capacitor 62 has a relatively low capacitance value, e.g. as stated only 0.1 microfarad, so that even in situations of limited space for this capacitor a high-quality product having a long lifetime can be employed. Thus one can avoid the use at this location of an electrolytic condenser, thereby increasing lifetime.

| Typical Values of the FIG. 3 Components motor 10 for 24 V and 3000 RPM, power consumption 5 Watts. (k = kohm, n = nF) | |
|---|---|
| Hall-IC | UGN k |
| resistor 42 | 4.7 k |
| resistor 43 | 220 k |
| resistors 48, 49 | 2.7 k |
| capacitor 46 | 22 n |
| capacitor 62 | 220 n |
| capacitors 57, 58 | 10 n |
| transistor 52 | BD 680 |
| transistor 53 | BD 679 |
| transistor 44 | BC 546 |
| transistor 45 | BC 556 |
| capacitor 37 | 100 μF |
| zener diode 54, 55 | ZY 60 |

Figure 5:
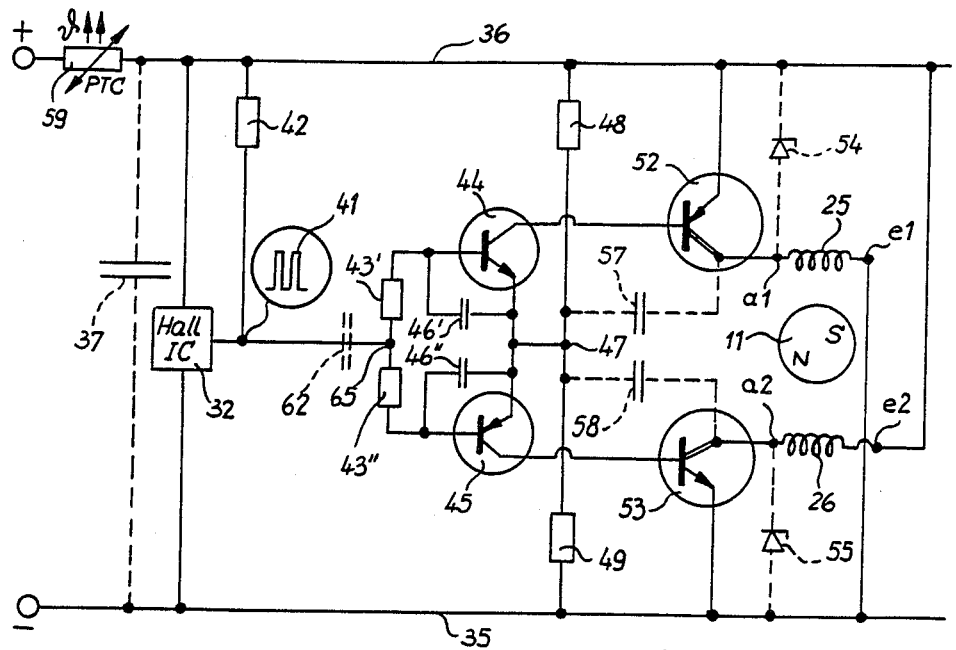
FIG. 5 depicts a second variant of FIG. 3.

FIG. 5 depicts a further variant of FIG. 2 which once again largely is identical to FIG. 2 so that the same reference numerals as there are again employed. In FIG. 5, one can likewise employ the coupling capacitor 62 (indicated in broken lines) in combination with the diode 60 in order to protect motor 10 against rotor blocking and against wrong-polarity connection to d.c. power or else as shown can employ the PTC resistor 59 in the positive line 36.

The one RC-stage 43, 63 in FIGS. 2 and 3 is, in FIG. 5, subdivided into one RC-stage 43', 46' for driver transistor 44 and one RC-stage 43'', 46'' for driver transistor 45. The capacitors 46', 46'' are each connected parallel to the emitter-base path of the associated driver transistor. The resistor 43' leads from the base of driver transistor 44 to a junction 65, and from the latter the resistor 43'' leads to the base of driver transistor 45. The junction 65 is connected to the output of Hall-IC 32 either via the coupling capacitor 62 or else directly; i.e., the resistor 43 is dispensed with in the FIG. 5 circuit and replaced by the resistors 43' and 43''.

The manner of operation of the FIG. 5 circuit corresponds to that of FIG. 2; i.e., with each change of state of the control voltage 41 the capacitors 46' and 46'' must be reverse-charged, which implements the desired switching delay and accordingly the current gap.

During operation, i.e. with the motor running, the FIG. 5 circuit exhibits the same advantageous characteristics as the circuit of FIGS. 2 or 3.

In FIG. 5 too, the voltage divider 48, 49 is advantageously designed with approximately equal resistors 48 and 49 in order to obtain at the center tap 47 approximately half the operating voltage; by virtue of the negative feedback provided by capacitors 57 and 58, the potential at point 47 can briefly change each time that switch-off operations occur.

Figure 6:
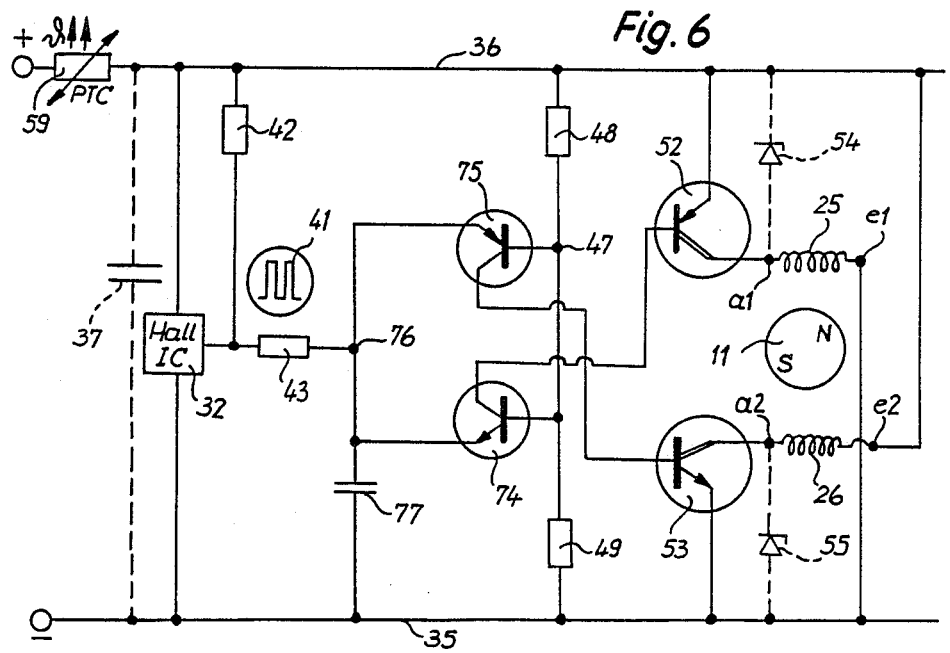
FIG. 6 depicts a further exemplary embodiment of the invention.

In FIG. 6 too, numerous elements of the FIG. 2 circuit are employed, and these are denoted by the same reference numerals as there and are not described again.

The pnp power transistor 52 in FIG. 6 has an npn driver transistor 74, and the npn power transistor 53 has a pnp driver transistor 75. The bases of the transistors 74 and 75 are here connected to the center tap 47 of the voltage divider 48, 49. The collector of transistor 74 is connected with the base of transistor 52, and the collector of transistor 75 is connected with the base of transistor 53. The emitters of transistors 74 and 75 are connected to a junction 76 which is connected to the output of Hall-IC 32 via a resistor 43 and to the negative line 35, namely ground, via a capacitor 77. The RC-stage is here formed by the resistor 43 and the capacitor 77.

OPERATION OF FIG. 6

Assume that the control signal 41 of Hall-IC 32 has until just now been low and has just now changed its state to its high value.

When the output signal was low the capacitor 77 was in substantially discharged state, and as a result the bases of transistors 74, 75 were more positive than their emitters, so that the transistor 74 and thus the power transistor 52 had been conductive. As a result of the rise in potential, the transistors 74 and 52 are now rendered non-conductive, and there flows via the reistors 42 and 43 a current in the capacitor 47, so that its voltage rises.

When the voltage at capacitor 77 has become sufficiently high the bases of transistors 74 and 75 become more negative than their emitters, so that—after elapse of the charging-up operation—the transistors 75 and 53 become conductive.

If now the control signal 41 changes state back down to its low value, then a transistor inside Hall-IC 32 becomes conductive, connecting the output of Hall-IC 32 to the negative line 35. Accordingly, via this (non-illustrated) transistor and via the resistor 43, the capacitor 77 is subjected to discharging. As this happens it is first of all the transistors 75 and 53 that become non-conductive. Only after further discharging, during which the two transistors 52 and 53 are in non-conductive state, do the transistors 74 and 52 become conductive again.

Thus one obtains here in a very simple way the desired current gap between the successive pulses of current in the conductors of the stator winding; and simultaneous conduction by the transistors 52 and 53 is—as with all the preceding embodiments—reliably avoided.

Figure 7:
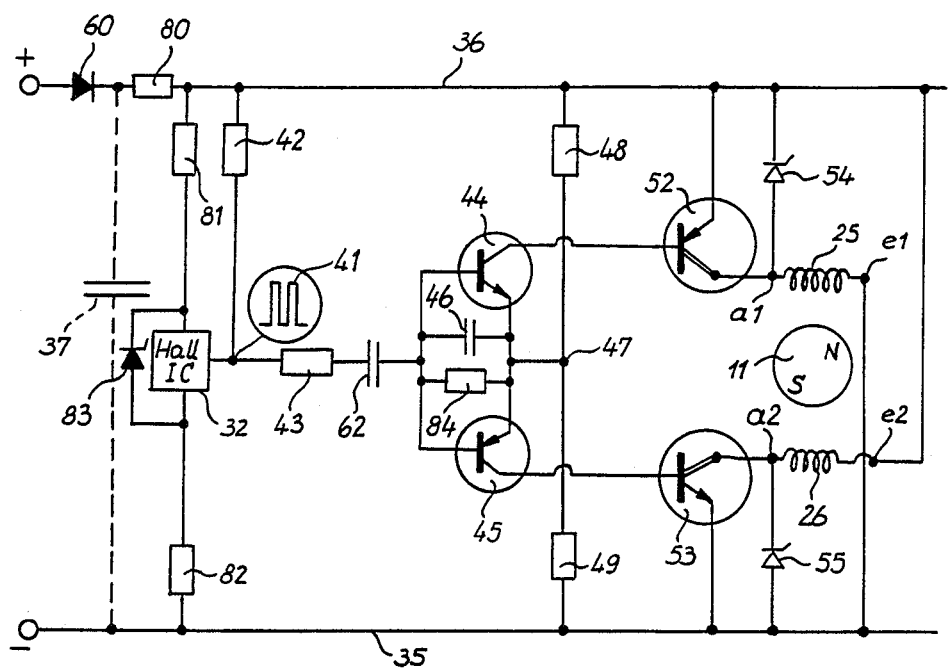

FIG. 7 depicts a preferred configuration for the circuit in the case of higher voltages, e.g. 48 V. As can be seen, the circuit is, almost in its entirety of symmetrical configuration. This circuit largely corresponds in configuration to that of FIG. 3 and, therefore, corresponding elements are denoted by the same reference numerals as there and not described again.

A meltable resistor 80 is connected in series with the diode 60 as a safety element, an auxiliary safety element. The Hall-IC 32 is connected via a resistor 81 to the positive line 36 and via a resistor 82 to the negative line 35 and, connected parallel to the Hall-IC is a zener diode 83 which limits the voltage on it to the diode's operating voltage, e.g. 24 V. The resistors 81 and 82 are approximately equally large, so that the Hall-IC 32 is connected symmetrically between the potentials of the lines 35 and 36.

A high-resistance resistor 84 is connected to the capacitor 46. The FIG. 7 circuit can be seen to have many advantages. The resistor 84 during operation is connected to a voltage of about 0.6 V and accordingly furnishes a current of about 1 microampere, which does not produce interference. When commutation occurs, this resistor effects an auxiliary discharging of the capacitor 46 in order to shorten the transistion of the hitherto conductive one of transistors 44 and 45 to its non-conductive state.

In the event rotor 11 becomes blocked there flows via the capacitor 62, from that time on, a base current to the transistor 44 or 45. The capacitor 62 accordingly charges up and this base current accordingly decreases, so that the operating point of the power transistors 52 or 53 shifts to a less favorable region of their operating curves. The resistor 84 then accelerates the charging-up of the coupling capacitor 62, so that the transition into the fully non-conductive state of power transistor 52 or 53 is hastened. Such a resistor can therefore be advantageously provided in FIG. 3 too, in order to accelerate the switch-off in the event of blocking. In the FIG. 5 case, it would be necessary that two such high-resistance resistors be provided each connected in parallel to a respective one of the capacitors 46', 46'', if the coupling capacitor 62 is provided. Accordingly, the FIG. 7 circuit also has a very simple construction with outstanding performance.

Typical Values of the Elements in FIG. 7
motor 10 for 30 to 56 V, 3000 RPM, power consumption 5 W
k = kohm, n = nF

| | |
|---|---|
| Hall-IC | UGN 3016 |
| Resistor 42 | 22 k |
| Resistor 43 | 560 k |
| resistors 48, 49 | 10 k |
| capacitor 46 | 15 n |
| resistor 84 | 510 k |
| capacitor 62 | 100 n |
| transistor 52 | BD 684 |
| transistor 53 | BD 683 |
| transistor 44 | BC 550 C |
| transistor 45 | BC 560 C |
| capacitor 37 | 100 μF |
| resistors 81, 82 | 1 k |
| zener diode 83 | 24 V |
| zener diodes 54, 55 | ZY 120 |

Naturally numerous modifications and further developments are possible for the person of ordinary skill within the scope of the present invention without departing from the scope established by the claims and by the dimensioning rules. Due to the low number of components the circuit for a motor in accordance with the invention can be incorporated, particularly easily, in the interior of the motor, e.g.g into the motor of a small-axial-length fan for cooling some device.

I claim:

1. A brushless d.c. motor (10) provided with a winding having at least one conductor pair, the conductor pair carrying two current pulses per 360°-el. of rotor rotation, and furthermore provided with rotor-position-dependent sensor means (32), the sensor means (32) controlling semiconductor control means (52, 53) associated with the conductor pair in order to control the current in the two conductors (25, 26) of the conductor pair
   (a1) one of the conductor pair's conductors (26) at one of its ends (a2) being connected via semiconductor control means of one conductivity type (e.g. npn transistor 53) to one terminal (e.g. negative terminal) of a d.c. current source and
   (a2) the conductor pair's other conductor (25) at one of its ends (a1) being connected via semiconductor control means of the opposite conductivity type (e.g. pnp transistor 52) to the other terminal (e.g. positive terminal) of the d.c. current source,
   (a3) establishment of the connection recited at paragraph (a1) above alternating with establishment of the connection recited at paragraph (a2) above, under the control of the sensor means (32),
   (b) the conductor pair's one conductor (26) furthermore being connected at its other end (e2) to the other terminal (e.g. positive terminal), and the conductor pair's other conductor (25) being connected at its other end (e1) to said one terminal (e.g. negative terminal) of the d.c. current source, and (c) at least those ends (a1, a2) of the conductor pair's two conductors that are connected to the semiconductor control means (52, 53) exhibiting a.c.-voltage coupling, wherein in accordance with the invention:

(d) each semiconductor control means (52, 53) has connected with it a respective driver transistor (44, 45; 74, 75) which is of a conductivity type opposite to that of the associated semiconductor control means (52, 53), the driver transistors (44, 45) accordingly being of conductivity types opposite to each other, (e) and resistor-capacitor time-delay means, comprising at least one RC-stage (43, 46; 43', 46', 43", 46"; 43, 77), connected to the driver transistors (44, 45), operative for introducing a predetermined time delay between disestablishment of the connection recited at paragraph (a1) above the establishment of the connection recited at paragraph (a2) above, as a result of which neither of the connections recited at paragraphs (a1) and (a2) above exists during this time delay, and conversely, introducing a predetermined time delay between disestablishment of the connection recited at paragraph (a2) above and establishment of the connection recited at paragraph (a1) above, as a result of which neither of the connections recited at paragraphs (a1) and (a2) above exists during this time delay.

2. Motor according to claim 1 in which the sensor means is a sensor (32) which during operation produces at its output a control signal alternating between "high" and "low", especially a so-called Hall-IC (32), wherein an emitter electrode of each of the driver transistors (44, 45; 74, 75) is connected to a substantially constant reference potential (point 47) that lies intermediate the potentials that the control signal (41) assumes in its "high" and "low" states, and wherein this control signal (41) is applied to a control electrode of each of the driver transistors (44, 45, 74, 75).

3. Motor according to claim 2 wherein an emitter electrode of each of the two driver transistors (44, 45; 74, 75) are both connected to the same substantially constant reference potential (point 47).

4. Motor according to claim 3, wherein a voltage divider (48, 49) is provided to produce the substantially constant reference potential.

5. Motor according to claim 2, wherein there is connected, between the control electrode and the emitter electrode of at least one driver transistor, a capacitor (46; 46', 46") of the RC-stage, and the resistor (43; 43', 43") of the RC-stage is arranged in the connection that feeds the control signal (41) to the control electrode of this driver transistor.

6. Motor according to claim 5 wherein between the control electrode and the emitter electrode of each of the driver transistors (44, 45) there is connected a capacitor (46', 46") of an RC-stage, and the resistor (43', 43") of the respective RC-stage is located in the line that feeds the control signal (41) to the control electrode of each driver transistor.

7. Motor according to claim 5, wherein a high-resistance resistor (84) is connected in parallel to the capacitor (46; 46', 46").

8. Motor according to claim 5, wherein, to serve as a blocked-rotor safety device for the motor (10), a coupling capacitor (62) is provided in the line from the output of the sensor (32) to the driver transistors (44, 45).

9. Motor according to claim 8 wherein there is provided for the charging of the coupling capacitor (62), parallel to the emitter-base paths of the driver transistors (44, 45), a high-resistance resistor (84) for accelerating the charging operation of the coupling capacitor (62) in the event the motor (10) is blocked.

10. Motor according to claim 5
wherein, in order to reduce voltage spikes occurring upon switch-off and to reduce high frequency oscillations, a negative-feedback coupling capacitor (57, 58) is provided at least between the output of a semiconductor control means (52, 53) and the corresponding emitter electrode of the associated driver transistors (44, 45), the output of said semiconductor control means being connected with one of the conductor pair's conductors (25, 26).

11. Motor according to claim 2,
wherein the control signal (41) is fed from the sensor (32) to the emitter electrodes via a resistor (43); and, between the emitter electrode and a reference potential (35), there is provided a capacitor (77) which together with this resistor (43) forms an RC-stage (FIG. 6).

12. Motor according to claim 1
wherein the semiconductor control means comprises complementary transistors, preferably complementary Darlington transistors (52, 53).

13. Motor according to claim 1, wherein the conductor pair's two conductors (25, 26) exhibit tight transformer-like coupling (FIG. 1, FIG. 4).

14. Motor according to claim 13 wherein the conductor pair's two conductors (25, 26) are wound as parallel wires in bifilar manner (FIG. 4).

15. Motor according to claim 1, wherein a coupling capacitor (50) is connected between those ends (a1, a2) of the conductor pair's two conductors (25, 26) that are connected with the two semiconductor control means (52, 53), in order to produce a tight a.c.-voltage-coupling at at least one end of the two conductors.

16. Motor according to claim 15 wherein the energy storage capacity of the coupling capacitor (50) corresponds to the order of magnitude of the energy that would be returned back into a storage element (37) upon occurrence of the change of conduction of said semiconductor control means.

* * * * *